United States Patent
Koga et al.

(10) Patent No.: US 9,105,942 B2
(45) Date of Patent: Aug. 11, 2015

(54) NON-AQUEOUS ELECTROLYTE SOLUTION AND USE THEREOF

(75) Inventors: Tatsuya Koga, Susono (JP); Hiroyuki Yamaguchi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 78 days.

(21) Appl. No.: 13/996,234

(22) PCT Filed: Dec. 27, 2010

(86) PCT No.: PCT/JP2010/073628
§ 371 (c)(1), (2), (4) Date: Jun. 20, 2013

(87) PCT Pub. No.: WO2012/090285
PCT Pub. Date: Jul. 5, 2012

(65) Prior Publication Data
US 2013/0280621 A1    Oct. 24, 2013

(51) Int. Cl.
*H01M 10/0568* (2010.01)
*H01M 10/056* (2010.01)
*H01M 10/0525* (2010.01)
*H01M 10/0569* (2010.01)
*H01M 4/587* (2010.01)
*H01M 10/0567* (2010.01)
*H01M 10/058* (2010.01)

(52) U.S. Cl.
CPC .......... *H01M 10/0568* (2013.01); *H01M 4/587* (2013.01); *H01M 10/058* (2013.01); *H01M 10/0525* (2013.01); *H01M 10/0567* (2013.01); *H01M 10/0569* (2013.01); *H01M 2220/20* (2013.01); *Y02E 60/122* (2013.01); *Y02T 10/7011* (2013.01); *Y10T 29/49108* (2015.01)

(58) Field of Classification Search
CPC ................ H01M 10/0568; H01M 10/0569; H01M 10/058; H01M 10/0525
USPC .............................. 429/332, 199; 29/623.1
See application file for complete search history.

(56) References Cited

U.S. PATENT DOCUMENTS

| | | |
|---|---|---|
| 2010/0010249 A1 | 1/2010 | Fujinami et al. |
| 2010/0291436 A1 | 11/2010 | Matsui |
| 2011/0008685 A1 | 1/2011 | Fujinami et al. |
| 2011/0229772 A1 | 9/2011 | Fujinami et al. |

FOREIGN PATENT DOCUMENTS

| | | |
|---|---|---|
| JP | 2-262270 | 10/1990 |
| JP | 10-144291 | 5/1998 |

(Continued)

*Primary Examiner* — Karie O'Neill Apicella
(74) *Attorney, Agent, or Firm* — Finnegan, Henderson, Farabow, Garrett & Dunner, LLP

(57) ABSTRACT

The present invention provides a non-aqueous electrolyte solution that can be used as an electrolyte solution of a non-aqueous secondary battery to improve the discharge rate performance of the battery. The non-aqueous electrolyte solution comprises a non-aqueous solvent and a $BF_3$-cyclic ether complex. The $BF_3$-cyclic ether complex content is greater than zero part by mass, but less than 1 part by mass relative to 100 parts by mass of the total amount of other electrolyte solution components. Preferable examples of the $BF_3$-cyclic ether complex include $BF_3$-tetrahydropyran complex and $BF_3$-dioxane complex.

12 Claims, 12 Drawing Sheets

(56) References Cited

FOREIGN PATENT DOCUMENTS

| JP | 11-149943 | 6/1999 | | | |
|---|---|---|---|---|---|
| JP | 2000-138072 | 5/2000 | | | |
| JP | 2008-069102 | 3/2008 | | | |
| JP | 2008-94825 | 4/2008 | | | |
| JP | 2008-266151 | 11/2008 | | | |
| JP | 2008-273893 | 11/2008 | | | |
| JP | 2008-297219 | 12/2008 | | | |
| JP | 2009-021183 | 1/2009 | | | |
| JP | 2010-67496 | 3/2010 | | | |
| JP | 2010067496 A | * | 3/2010 | ........ | H01M 10/0569 |
| WO | WO 2008/032795 | 3/2008 | | | |

\* cited by examiner

NON-AQUEOUS ELECTROLYTE SOLUTION AND USE THEREOF

CROSS-REFERENCE TO RELATED APPLICATIONS

This application is a national phase application of International Application No. PCT/JP2010/073628, filed Dec. 27, 2010, the content of which is incorporated herein by reference.

FIELD OF INVENTION

The present invention relates to a non-aqueous electrolyte solution useful as a component of a lithium-ion secondary battery and other non-aqueous secondary batteries.

BACKGROUND ART

It has been suggested to add $BF_3$ or a complex containing $BF_3$ (a $BF_3$ complex) to electrolyte solutions of non-aqueous lithium secondary batteries. For example, Patent Document 1 teaches that capacity reduction rates can be lowered by addition of $BF_3$, HBF and their complexes as capacity reduction rate-suppressing additives, that capacity reduction rates were lowered by addition of $BF_3$-diethyl carbonate complex, and that addition of $BF_3$-diethyl ether complex may contribute to lowering of capacity reduction rates under certain test conditions. Patent Document 2 teaches adding a Werner complex of $BF_3$ to an electrolyte solution to increase cycle properties (capacity retention rates), with $BF_3$-diethyl carbonate complex being used in worked examples. Patent Documents 3 and 4 are technical literature related to techniques for obtaining a highly anti-oxidative electrolyte solution by use of a $BF_3$-ether complex as a solvent for the electrolyte solution.

TECHNICAL LITERATURE

Patent Documents

[Patent Document 1] Japanese Patent Application Publication No. H11-149943
[Patent Document 2] Japanese Patent Application Publication No. H10-144291
[Patent Document 3] Japanese Patent Application Publication No. 2008-94825
[Patent Document 4] Japanese Patent Application Publication No. 2010-67496

SUMMARY OF INVENTION

Problem to be Solved

The discharge capacity of a battery varies depending on the discharge rate at which the measurement is made. In general, as the discharge rate increases (as the discharge current increases), the discharge capacity decreases. High output power (rapid discharge performance) is expected of a battery used as a drive power supply in a vehicle or the like. Thus, a desirable battery is such that the capacity would not decrease even when the battery is discharged at a higher rate, in other words, the discharge capacity has a small discharge rate dependence (i.e., the battery exhibits good discharge rate performance). However, Patent Documents cited above do not either disclose a $BF_3$ complex as an electrolyte solution additive would affect the discharge rate performance, or have any intention to increase the discharge the discharge rate performance by use of a $BF_3$ complex.

One objective of the present invention is to provide a non-aqueous electrolyte solution for use in a lithium-ion secondary battery and other non-aqueous secondary batteries, with the non-aqueous electrolyte solution being capable of producing a non-aqueous secondary battery that exhibits better discharge rate performance. Another objective of the present invention is to provide a method for producing such a non-aqueous electrolyte solution. Another related objective is to provide a battery comprising the non-aqueous electrolyte solution.

Solution to Problem

The present inventors discovered that inclusion of a small amount of a $BF_3$-cyclic ether complex in a non-aqueous electrolyte solution could greatly improve discharge rate performance of a battery comprising the electrolyte solution. They further discovered that according to such a $BF_3$-cyclic ether complex, with respect to both discharge rate performance and cycle properties, addition thereof resulted in greater improvement for a smaller amount than did a $BF_3$-acyclic ether complex (typically $BF_3$-diethyl ether complex).

The present invention provides a non-aqueous electrolyte solution for a non-aqueous secondary battery. The non-aqueous electrolyte solution comprises a non-aqueous solvent and a $BF_3$-cyclic ether complex. The $BF_3$-cyclic ether complex content X in the non-aqueous electrolyte solution is greater than zero part by mass, but less than 1 part by mass relative to 100 parts by mass of other components (i.e., with the $BF_3$-cyclic ether complex being excluded) of the electrolyte solution. In other words, the non-aqueous electrolyte solution comprises a $BF_3$-cyclic ether complex in an amount corresponding to greater than 0 wt %, but less than 1 wt % of the other electrolyte solution components excluding the $BF_3$-cyclic ether complex when the combined mass of the other components are considered to account for 100 wt %. In a preferable embodiment, the electrolyte solution comprises, as the $BF_3$-cyclic ether complex, at least one of $BF_3$-tetrahydropyran complex and $BF_3$-dioxane complexes. The $BF_3$-dioxane complex may have a structure in which only one of the two oxygen atoms constituting the dioxane ring is bound to $BF_3$, or a structure in which each oxygen atom is bound to $BF_3$.

According to a non-aqueous electrolyte solution having such a composition, inclusion of the $BF_3$-cyclic ether complex at the prescribed amount can increase the discharge capacity of a non-aqueous secondary battery (e.g., a lithium secondary battery, typically a lithium-ion secondary battery) constituted with the electrolyte solution. In typical, relative to a battery constituted with an electrolyte solution having a composition to which the $BF_3$-cyclic ether had not been added, a larger increase in the discharge capacity is produced when the discharge capacity is measured at a high discharge rate (e.g., 5 C or higher) rather than when the discharge capacity is measured at a low discharge rate (e.g., 1 C or lower; here, 1 C is the amount of current that allows charging of a battery to its full capacity (Ah) predicted from the theoretical capacity in one hour). This can effectively improve the discharge rate performance.

In the present description, the term "secondary battery" refers to an electric storage device in general that can be charged and discharged repeatedly, and the scope of the term encompasses so-called storage batteries such as lithium-ion secondary batteries, nickel-hydrogen batteries, nickel-cadmiuta batteries and the like as well as electric storage elements such as electric double layer capacitors and the like. The term "non-aqueous secondary battery" refers to a battery comprising a non-aqueous electrolyte solution (typically an electrolyte solution comprising a supporting salt (supporting electrolyte) in a non-aqueous solvent). The term "lithium secondary battery" refers to a secondary battery using lithium ions as electrolytic ions where charging and discharging are mediated by lithium ions moving between the positive and negative electrodes. Secondary batteries generally referred to as lithium-ion batteries or lithium-ion secondary batteries are typical examples included in the scope of the lithium secondary battery in the present description. Electrode active material refers to a material capable of reversibly storing and releasing chemical species acting as charge carriers (e.g., lithium ions in a lithium-ion secondary battery).

The art disclosed herein can be preferably applied to a non-aqueous electrolyte solution wherein 50 vol % or more of the non-aqueous solvent consists of one, two or more species of carbonate-based solvent. In a non-aqueous electrolyte solution having such a composition, inclusion of a $BF_3$-cyclic ether complex is especially meaningful. For instance, in a non-aqueous secondary battery (typically a lithium-ion secondary battery) constituted with the non-aqueous electrolyte solution, can be effectively improved one, two or more capabilities among the output performance (e.g., discharge rate performance), durability (e.g., cycle properties), and other capabilities of the battery.

The present description provides a preferable method for producing a lithium-ion secondary battery. The method comprises providing a positive electrode comprising a positive electrode active material, and a negative electrode comprising a negative electrode active material. It also comprises providing a non-aqueous electrolyte solution disclosed herein (an electrolyte solution comprising a $BF_3$-cyclic ether complex at greater than zero part by mass, but less than 1 part by mass relative to 100 parts by mass of other electrolyte solution components). It further comprises constituting a lithium-ion secondary battery by placing the positive electrode, the negative electrode, and the non-aqueous electrolyte solution in a container. According to such a method, can be produced a lithium-ion battery that excels in the discharge rate performance (preferably, also in the cycle properties).

The present description provides another preferable method for producing a lithium-ion secondary battery. The method comprises providing a positive electrode comprising a positive electrode active material, and a negative electrode comprising a negative electrode active material. The negative electrode comprises a negative electrode active material portion formed of a material comprising the negative electrode active material as the primary component. The method also comprises providing a non-aqueous electrolyte solution comprising a non-aqueous solvent and a $BF_3$-cyclic ether complex. It further comprises constituting a lithium-ion secondary battery by placing the positive electrode, the negative electrode, and the non-aqueous electrolyte solution in a container. Here, the non-aqueous electrolyte solution is placed in the container such that the $BF_3$-cyclic ether complex is contained in the electrolyte solution in an amount greater than 0 $mg/cm^2$ up to 0.1 $mg/cm^2$ of the external surface area of the negative electrode active material portion. According to such a method, can be produced a lithium-ion battery that excels in the discharge rate performance (preferably, in both the discharge rate performance and cycle properties).

The art disclosed herein can be preferably applied to a lithium-ion secondary battery comprising, as a negative electrode active material, carbon particles having a graphite structure at least partially. It is also preferable as the electrolyte solution of such a secondary battery. Inclusion of a $BF_3$-cyclic ether complex is especially meaningful in a lithium-ion secondary battery having such a composition. For instance, can be effectively improved one, two or more capabilities among the output performance (e.g., discharge rate performance), durability (e.g., cycle properties), and other capabilities of the battery.

A lithium-ion secondary battery disclosed herein (which can be a lithium-ion secondary battery produced by a method disclosed herein) exhibits good output performance. For example, the discharge capacity at a low discharge rate can be maintained relatively well even at a high discharge rate. In a preferable embodiment, it excels also in the durability (e.g. cycle properties). Because it can produce such high performance, it is preferable, for instance, as a power supply to be loaded on a vehicle. Thus, the lithium-ion secondary battery disclosed herein can be preferably used as a motor power supply (typically a drive power supply) be loaded on a drive power supply) to be loaded on a vehicle comprising an electric motor, such as a hybrid automobile or an electric automobile.

DESCRIPTION OF EMBODIMENTS

Figure 1:
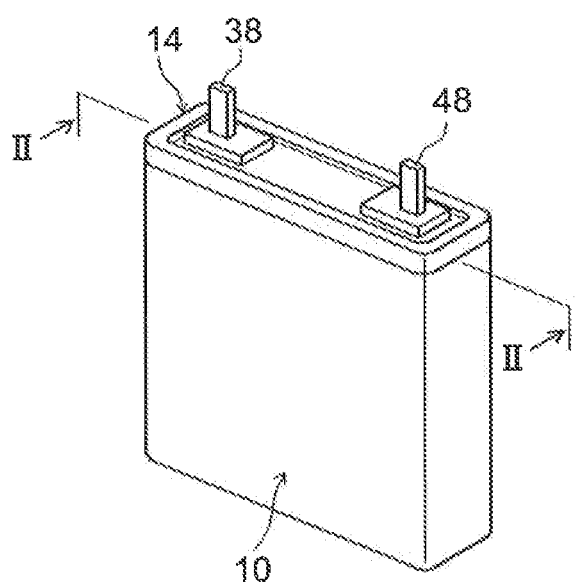
FIG. 1 shows a perspective view illustrating an external form of a non-aqueous secondary battery according to an embodiment.

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field.

The non-aqueous electrolyte solution disclosed herein is characterized by comprising a $BF_3$-cyclic ether complex in a non-aqueous solvent. Here, the $BF_3$-cyclic ether complex refers to a complex that has a $BF_3$ moiety and a cyclic ether moiety, with a lone pair of electrons on an oxygen atom constituting the ether ring is bound to an empty orbital of the boron atom in the $BF_3$ moiety. The structure of the complex can be identified by means such as $^{13}C$-NMR analysis, $^1H$-NMR analysis, and so on. The formation of a complex of an ether ring and $BF_3$ (e.g., that they are not simply in a solvated state) can be confirmed from chemical shifts in its NMR spectrum.

The ether ring is a structural moiety comprising at least one etheric oxygen as a ring-constituting atom. It can be either a saturated cyclic ether or an unsaturated cyclic ether. The number of atoms constituting the ether ring is preferably 5 to 8, or more preferably 5 or 6. The cyclic ether moiety may comprise two or more etheric oxygen atoms as ring-constituting atoms. In such an ether ring, only some (e.g., one) of the etheric oxygen atoms may be bound to $BF_3$, or all the etheric oxygen atoms may be bound to $BF_3$, respectively. The cyclic ether moiety may further comprise one, two or more species of other heteroatoms such as sulfur (S), nitrogen (N), etc., in addition to one, two or more etheric oxygen atoms. In such an ether ring, some or all of etheric oxygen atoms may be bound to $BF_3$, respectively; and furthermore, some or all of the other heteroatoms may be bound to $BF_3$, respectively. The ether ring may have one, two or more substituents bonded to its ring-constituting atom(s), or may not have such substituents. When the ring has a substituent, preferable examples thereof include alkyl groups and alkoxy groups, each having 1 to 6 (preferably 1 to 3, more preferably 1 to 2, typically 1) carbon atom(s).

In a preferable embodiment, one or two ether ring-constituting atoms are etheric oxygen atoms, and the others are carbon atoms. While it can be either a saturated cyclic ether or an unsaturated cyclic ether, usually a saturated cyclic ether is more preferable. Preferable examples of such a saturated cyclic ether include dioxane (DOX), tetrahydropyran (THP) and tetrahydrofuran (THF). Such an ether ring may have one, two or more substituents (e.g., alkyl groups having 1 to 3 carbon atoms) bonded to the ring-constituting atom(s), or may not have such substituents.

Specific example of a $BF_3$-cyclic ether complex preferable in the art disclosed herein include $BF_3$-THP complex, $BF_3$-T1-F complex, and $BF_3$-dioxane complexes (meaning to include $1BF_3$-DOX complex in which only one of the two oxygen atoms contained in the dioxane ring is bound to $BF_3$ as well as $2BF_3$-DOX complex in which each of the two oxygen atoms contained in the dioxane ring is bound to $BF_3$). These complexes may have one or two alkyl groups having 1 to 3 carbon atoms on their ether rings. Particularly preferable examples include $BF_3$-THP complex (chemical formula (2) described later) and $2BF_3$-DOX complex (chemical formula (3) described later).

A $BF_3$-cyclic ether complex constituting the electrolyte solution disclosed herein can be produce, for instance, by allowing $BF_3$ gas to pass through a starting organic substance (typically, a cyclic ether corresponding to the structure of the target complex).

As a preferable method for producing the $BF_3$-cyclic ether complex, can be cited a method comprising: mixing a cyclic ether corresponding to the target $BF_3$-cyclic ether complex and a $BF_3$-leaving ether complex in which a leaving ether group (an ether to be replaced) different from the cyclic ether is bound to $BF_3$, and subsequently removing the leaving ether from the reaction system. This method utilizes transetherification reaction of $BF_3$-leaving ether complex and a cyclic ether. Such a production method offers an advantage of easier handling of materials used as compared to the $BF_3$ gas passing method.

Using a case where $BF_3$-THP complex is produced as an example, the production method utilizing the transetherification reaction will be described in detail. In particular, by mixing $BF_3$-diethyl ether complex ($BF_3$-leaving ether complex) and THP (cyclic ether corresponding to the target structure) and replacing the diethyl ether moiety in $BF_3$-diethyl ether complex with THP, $BF_3$-THP complex as the target substance is synthesized. More specifically, for instance, $BF_3$-diethyl ether complex and THP are mixed together (mixing step), and by stirring the mixture under an atmosphere of an inert gas (e.g., argon gas) and further heating the mixture under reduced pressure, diethyl ether is distilled away from the reaction system (removing step).

A preferable $BF_3$-leaving ether complex is that being present as a liquid at ambient temperature. Here, "being present as a liquid at ambient temperature" means exhibiting fluidity at $25°$ C. Such a $BF_3$-leaving ether complex is preferable because it readily mixes with a cyclic ether (which is typically present as a liquid at ambient temperature) and is easy to handle. Since the ether moiety in a $BF_3$-leaving ether complex is to be removed (e.g., distilled away by distillation under reduced pressure) from the reaction system in the removing step, a preferable $BF_3$-leaving ether complex comprises a $BF_3$-bound ether that can be readily removed in the removing step. Although not particularly limited, a preferable leaving ether has a boiling point in a range of, for example, $-50°$ C. to $70°$ C. A preferable leaving ether has a molecular weight in a range of, for instance, 40 to 200 (more preferably 46 to 150).

While the type of leaving ether preferably used may vary depending on the type of cyclic ether that substitutes for the leaving ether, it is usually preferable to use diethyl ether or dimethyl ether. Use of diethyl ether is particularly preferable because $BF_3$-diethyl ether complex is available as a commercial product.

In the mixing step, the mixing ratio of the $BF_3$-leaving ether complex to the cyclic ether is not particularly limited. Usually; it is suitable that the molar ratio of the $BF_3$-leaving ether complex: the cyclic ether is about 1:0.5 to 1:2.0. For instance, it is preferable to be about 1:0.9 to 1:1.5 (typically 1:1 to 1:1.3). By admixing the cyclic ether in an amount somewhat larger (e.g., by an excess of about 5 to 30% based on the number of moles) than the $BF_3$-leaving ether complex, the $BF_3$-cyclic ether complex can be produced efficiently.

After $BF_3$-leaving ether complex and the cyclic ether are mixed together, the temperature at which the mixture is stirred is not particularly limited. Usually, a temperature that allows the reaction system to stay as a liquid (in other words, a temperature that can effect the transetherification as a liquid phase reaction) is suitable. For instance, the temperature can be preferably around $0°$ C. to $80°$ C. From the standpoint of the energy costs, etc., the stirring can be carried out at room temperature (typically around $10°$ C. to $30°$ C.), or with heating (e.g., at $35°$ C. to $60°$ C.) to allow the transetherification reaction to progress, etc.

Examples of a method for removing the leaving ether moiety in the $BF_3$-leaving ether complex from the reaction system in the removing step include a method where an inert gas such as nitrogen gas, argon gas, or the like is passed through, a heating method, a depressurizing method, and like methods. These methods can be suitably combined as well.

In the removing method where an inert gas is passed through, examples of the inert gas to be used include nitrogen gas, argon gas, and the like. While such an inert gas is passed through, the mixture can be preferably stirred at about room temperature to 60° C. Although the time length for stirring is not particularly limited, it is usually suitable to be 50 hours or longer (e.g., around 50 hours to 150 hours).

In the removing method involving heating, a preferable heating temperature may vary depending on the types of $BF_3$-leaving ether complex and cyclic ether. It is usually preferable to be in a range of 40° C. to 90° C.

In the removing method involving depressurization, a preferable reduced pressure level may vary depending on the types of $BF_3$-leaving ether complex and cyclic ether. It is usually suitable to be about $2.5 \times 10^4$ Pa to $700 \times 10^4$ Pa (approximately 200 mmHg to 500 mmHg).

As the non-aqueous solvent in the non-aqueous electrolyte solution disclosed herein, can be used various aprotic solvents generally known to be usable as solvents in non-aqueous electrolyte solutions (e.g., electrolyte solutions for lithium secondary batteries). For example, can be used a single species or a suitable combination of two or more species among various aprotic solvents such as carbonates, esters, ethers, nitriles, sulfones lactones, and the like. Specific examples include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformaldehyde, dimethylsulfoxide, sulfolane, γ-butyrolactone, and the like. The non-aqueous solvent is preferably present as a liquid at room temperature (e.g., 25° C.) as a whole (when several compounds are contained, as a mixture thereof).

As a preferable non-aqueous solvent in the art disclosed herein, can be cited a non-aqueous solvent (a carbonate-based solvent) comprising one, two or more species of carbonates, with the carbonates having a combined volume accounting for 50 vol % or greater of the volume of the entire non-aqueous solvent. For example, in a preferable non-aqueous electrolyte solution, the combined volume of carbonates accounts for 60 vol % or greater (more preferably 75 vol % or greater, even more preferably 90 vol % or greater, or possibly essentially 100 vol %) of the volume of the entire non-aqueous solvent.

The non-aqueous electrolyte solution disclosed herein typically comprises further a supporting electrolyte (supporting salt) in addition to the non-aqueous solvent and the $BF_3$-cyclic ether complex. As such a supporting electrolyte, can be used one, two or more species selected from various lithium salts known to be able to function as supporting electrolytes in lithium-ion secondary batteries, with examples including $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ and the like. Among these, $LiPF_6$ is particularly preferable. The concentration of the supporting electrolyte is not particularly limited, and it can be, for instance, around the same level as in a conventional lithium-ion secondary battery. It is usually suitable that the concentration of the supporting electrolyte is about 0.1 mol/L to 5 mol/L (e.g., about 0.8 mol/L to 1.5 mol/L).

In a preferable embodiment of the non-aqueous electrolyte solution disclosed herein, the $BF_3$-cyclic ether complex content X (when two or more species of $BF_3$-cyclic ether complex are contained, their combined content) is preferably greater than zero part by mass, but less than 1 part by mass (i.e., 0<x<1) relative to 100 parts of the total amount of the other electrolyte solution components. For example, as in the worked examples described later, by providing a standard electrolyte solution containing a supporting electrolyte dissolved in a non-aqueous solvent at a suitable concentration, adding X parts by mass (here, 0<X<1) of a $BF_3$-cyclic ether complex to 100 parts of the standard electrolyte solution, and mixing the resultant homogeneously, the non-aqueous electrolyte solution disclosed herein can be preferably prepared. In usual, the $BF_3$-cyclic ether complex content X relative to 100 parts by mass of the other electrolyte solution components is suitably 0.7 part by mass or less, or more preferably 0.5 part by mass or less (typically less than 0.5 part by mass). The content X can be 0.3 part by mass or less (e.g., 0.03 to 0.3 part by mass).

The lower limit of the $BF_3$-cyclic ether complex content is not particularly limited as far as battery capabilities (e.g., one or each of the discharge rate performance and cycle properties tested by the methods described later in the worked examples) can be increased by the complex in that amount in comparison to a lithium-ion secondary battery constituted with an electrolyte solution (the standard electrolyte solution) having a composition free of a $BF_3$ complex. Usually, it is suitable to be 0.01 part by mass or greater (typically 0.02 part by mass or greater, e.g., 0.03 part by mass or greater) relative to 100 parts by mass of the other electrolyte solution components.

In another preferable embodiment of the non-aqueous electrolyte solution disclosed herein, the $BF_3$-cyclic ether complex content is preferably greater than zero part by mass, but 0.3 part by mass or less relative to 100 parts by mass of the other electrolyte solution components based on the mass of $BF_3$ contained in the complex (i.e., based on $BF_3$). In usual, the $BF_3$-cyclic ether complex content is, based on $BF_3$, suitably 0.2 part by mass or less, or more preferably 0.1 part by mass or less (e.g., less than 0.1 part by mass, typically 0.005 part by mass or greater) relative to 100 parts by mass of the other electrolyte solution components.

The non-aqueous electrolyte solution disclosed herein can comprise yet other component(s) as necessary. As examples of such optional components, can be cited a polymer precursor (which may be a monomer, an oligomer, or a mixture of these, etc.) to turn the non-aqueous electrolyte solution into a gel, and an initiator or a crosslinking agent to initiate or promote the gelling reaction. As another example, can be cited a dehydrating agent to react with and eliminate water present or mixed in the electrolyte solution. Yet other examples include anti-overcharging agents such as aromatic compounds, flame retardants such as phosphazene compounds, and so on. On the other hand, it may be a non-aqueous electrolyte solution consisting essentially of a non-aqueous solvent (typically a carbonate-based solvent) and a $BF_3$-cyclic ether complex, or a non-aqueous electrolyte solution consisting essentially of a non-aqueous solvent, a non-aqueous electrolyte, and a $BF_3$-cyclic ether complex.

The non-aqueous electrolyte solution disclosed herein can be widely applied to lithium-ion secondary batteries and various other non-aqueous secondary batteries, and contribute to increase the capabilities of the batteries. For example, it may increase one, two or more capabilities among the output performance (e.g., discharge rate performance), durability (e.g., cycle properties), and other capabilities of the battery. In practicing the art disclosed herein, it is unnecessary to reveal why such effect can be obtained; however, it can be considered as follows: That is, during initial charging process, etc., a $BF_3$-ether complex is decomposed along with electrolyte solution components (non-aqueous solvent, supporting salt, etc.), whereby electrode surfaces are coated with SEI (Solid Electrolyte Interface) film formed of the decomposition products thereof. This suppresses further decomposition of electrolyte solution components, possibly contributing to increase the capabilities of the battery. Therein, it is considered that unlike a $BF_3$-acyclic ether complex, a $BF_3$-cyclic ether complex may form a polymer or crosslinked structures via ring-opening polymerization of the ether ring while SEI film is being formed, and this may allow formation of SEI film of better quality on electrode surfaces. For example, the ring-opening polymerization contributes to formation of SEI film less likely to peel off the surfaces of electrodes (especially the negative electrode). Thus, it is considered that as compared to a $BF_3$-acyclic complex incapable of producing such ring-opening polymerization, a $BF_3$-cyclic ether complex in a smaller amount (at a lower concentration) can form SEI film that suitably covers electrode surfaces, and is also able to maintain the SEI film in a good state (e.g., even if the electrode active materials undergo expansion and shrinkage upon charging and discharging, the SE film is unlikely to peel off the electrode surfaces). On the other hand, it is considered that excessive usage of a $BF_3$-cyclic ether complex may actually decrease the battery properties because it results in excessively thick SEI film, increasing the internal resistance of the battery, or the decomposition of the $BE_3$ complex consumes electric current, decreasing the charge-discharge efficiency.

It is noted that even if the non-aqueous electrolyte solution disclosed herein has a composition comprising a $BF_3$-cyclic ether complex at the time of fabrication (assembly) of a battery, part or all of the $BF_3$-cyclic ether complex may be decomposed by initial charging and discharging or subsequent charging and discharging as described above. With respect to a battery in such a state, the presence of a $BF_3$ complex that had been present in the non-aqueous electrolyte solution used at the time of fabrication of the battery can be confirmed, for instance, by the presence of peaks belonging to $BF_3$ observed in mass spectrometry of the electrolyte solution or the electrode. The fcet that the $BF_3$ complex was indeed a cyclic ether complex can be confirmed, for instance, by absence of peaks belonging to methyl group (as in $—O—CH_3$, $—O—CH_2—CH_3$, etc.) in NMR analysis of the electrolyte solution or the electrode (as an acyclic ether complex usually has a methyl group ($—CH_3$)). As for a means to determine the amount of a $BF_3$ complex that had been contained in the non-aqueous electrolyte solution used at the time of fabrication of a battery from the battery after initial charging and discharging (or after subjected to further charging and discharging), can be employed mass spectrometry IR analysis, etc., of the battery components (electrolyte solution, electrodes, etc.).

As a preferable usage example of the non-aqueous electrolyte solution disclosed herein, a lithium-ion secondary battery and its production method are described below while the use of the non-aqueous electrolyte solution according to the present invention is not to be limited to such a battery. In the drawings referred to below, members and sites providing the same effect may be indicated by the same reference numeral, and redundant descriptions may be omitted or simplified. Moreover, the dimensional relationships (of length, ith, thickness, etc.) in the respective drawings do not represent actual dimensional relationships.

Figure 2:
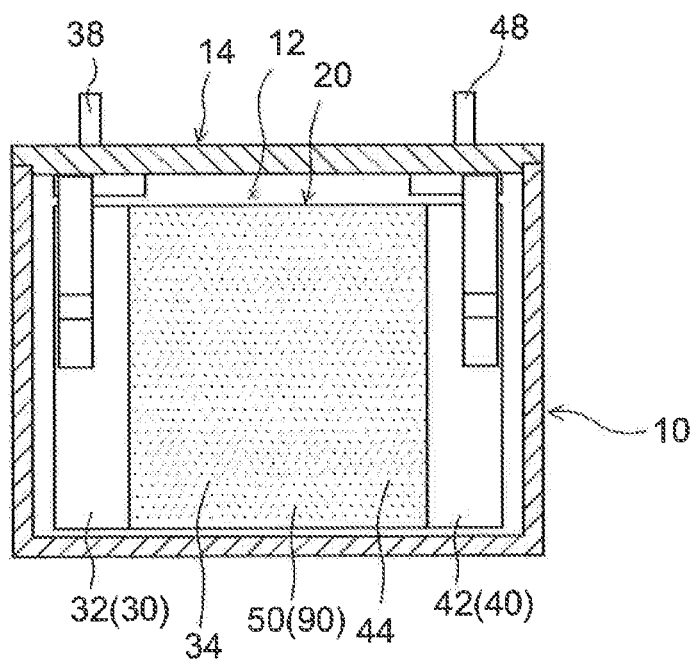
FIG. 2 shows a cross-sectional view taken along line II-II in FIG. 1.

As shown in FIG. 1 and FIG. 2, a lithium-ion secondary battery 100 has a constitution where a wound electrode body 20 is contained along with a non-aqueous electrolyte solution 90 disclosed herein in a flat box-shaped battery case 10 corresponding to the shape of the electrode body 20. An opening 12 of the case 10 is closed with a lid 14. Lid 14 has a positive terminal 38 and a negative terminal 48 for connection to the outside, with the terminals partially extending out from the surface of lid 14.

Electrode body 20 has a flattened shape formed by overlaying and winding up a positive electrode sheet 30 comprising a positive electrode material layer 34 formed on a surface of a positive current collector 32 and a negative electrode sheet 40 comprising a negative electrode material layer 44 formed on a surface of a negative current collector 42 along with two long sheets of separator 50, and laterally compressing the resulting wound body.

Positive electrode sheet 30 is formed to expose positive current collector 32 on an edge along the length direction, where positive electrode active material layer 34 is not provided. Similarly, negative electrode sheet 40 is formed to expose negative current collector 42 on an edge along the length direction, where negative electrode active material layer 44 is not provided. Positive terminal 38 is joined to the exposed edge of positive current collector 32 and negative terminal 48 is joined to the exposed edge of negative current collector 42, respectively; to form electrical connections with positive electrode sheet 30 and the negative electrode sheet 40 of the flattened wound electrode assembly 20.

Positive electrode active material layer 34 can be preferably fabricated, for instance, by applying to positive current collector 32 a paste or slurry composition prepared by dispersing in a suitable solvent a positive electrode active material along with a conductive material, a binder, etc., if necessary, and allowing the composition to dry. As the positive electrode active material, can be used a material capable of reversibly storing and releasing lithium, and one, two or more species of substances (e.g., layered oxides and spinel oxides) conventionally used in lithium-ion secondary batteries can be used without particular limitations. Preferable examples include lithium-containing composite oxides such as lithium-nickel-based composite oxides, lithium-cobalt-based composite oxides, lithium-manganese-based composite oxides, and the like.

Herein, the scope of the lithium-nickel-based composite oxide encompasses oxides containing lithium (Li) and nickel (Ni) as metal components as well as oxides containing as metal components, in addition to lithium and nickel, at least one other metal species (i.e., a transition metal and/or a main group metal other than Li and Ni) at a ratio roughly equal to or less than nickel (typically at a ratio less than nickel) based on the number of atoms. The other metal besides Li and Ni may be, for instance, one, two or more metal species selected from a group consisting of Co, Al, Mn, Cr, FeCr, Fe, Mg, Ti, Zr, Nb, Mo, W, Cu, Zn, Ga, In, Sn, La and Ce. The same applies also to the scopes of the lithium-cobalt-based composite oxide and the lithium-manganese-based composite oxide. Examples of a preferable positive electrode active material in the art disclosed herein include a lithium-transition metal composite oxide comprising at least Ni, Co and Mn (e.g., comprising the three metal species, namely, Ni, Co and Mn, in approximately equal amounts) as metal components.

Other preferable examples of a material usable as the positive electrode active material include an olivine lithium phosphate and other polyanionic materials. The olivine lithium phosphate may be an olivine lithium phosphate ($LiFePO_4$, $LiMnPO_4$, etc.) represented by general formula $LiMPO_4$ (wherein NM is at least one or more species selected from Co, Ni, Mn and Fe).

Examples of the conductive material include carbon materials such as carbon powder, carbon fibers, etc., and conductive metal powders such as nickel powder, etc. As the carbon powder, can be preferably used a carbon black such as acetylene black, furnace black, or the like. Among these conductive materials, can be used one species solely, or two or more species in combination. Examples of the binder, include carboxymethyl cellulose (CMC), polyvinyl alcohol (PXA), polytetrafluoroethylene (PTFE), styrene-butadiene block copolymers (SBR), polyvinylidene fluoride (PVDF), and the like. Among these binders, can be used one species solely, or two or more species in a suitable combination.

The amount of the positive electrode active material contained in the entire positive electrode active material layer is suitably about 50% by mass or greater (typically 50 to 95% by mass), and it is usually preferable to be about 70 to 95% by mass. When a conductive material is used, the amount of the conductive material contained in the entire positive electrode active material layer can be about 2 to 20% by mass, and it is usually preferable to be about 2 to 15% by mass. When a binder is used, the amount of the binder contained in the entire positive electrode active material layer can be about 1 to 10% by mass, and it is usually suitable to be about 2 to 5% by mass.

As positive current collector 32, can be preferably used a conductive member formed of a metal having a good conductivity. For example, can be used aluminum or an alloy containing aluminum as the primary component. The shape of positive current collector 32 is not particularly limited as it may vary in accordance with the shape, etc., of the lithium-ion secondary battery, and it may have a variety of shapes such as a rod, plate, sheet, foil, mesh, and so on. In the present embodiment, an aluminum sheet is used as positive current collector 32, and preferably used in lithium-ion secondary battery 100 comprising wound electrode body 20. In such an embodiment, for instance, an aluminum sheet (aluminum foil) having a thickness of about 10 $\mu$m to 30 $\mu$m can be preferably used.

Negative electrode 40 of the lithium-ion secondary battery 100 according to the present embodiment comprises a negative electrode active material layer 44 formed on a surface of a long sheet of negative current collector 42, as the negative electrode active material portion formed of a material comprising a negative electrode active material as the primary component. The negative electrode active material layer 44 can be preferably fabricated, for instance, by applying to negative current collector 42 a paste or slurry composition prepared by dispersing in a suitable solvent a negative electrode active material along with a binder, etc., and allowing it to dry. The lithium-ion secondary battery disclosed herein may comprise, for example, a negative electrode active material portion molded by compacting a negative electrode active material along with a binder, etc., instead of a negative electrode active material layer formed as described above by applying and drying a slurry composition on a negative current collector. In the negative electrode in the lithium-ion secondary battery disclosed herein, the negative electrode active material portion may be retained on a negative current collector or may not have a negative current collector. From the standpoint of the efficiency of current collection, it is advantageous that the negative electrode active material portion is retained by a negative current collector.

As the negative electrode active material, one, two or more species of substances conventionally used in lithium-ion secondary batteries can be used without particular limitations. Examples of a preferable negative electrode active material include carbon particles. It is preferable to use a particulate carbon material (carbon particles) comprising a graphite structure (layered structure) at least partially. Any carbon material among so-called graphitic substances (graphite), hard-to-graphitize carbonaceous substances (hard carbons), easy-to-graphitize carbonaceous substances (soft carbons) and substances having a structure combining these can be preferably used. Among these, particles of a graphite such as natural graphite, etc., can be preferably used. The amount of the negative electrode active material contained in the entire negative electrode active material layer is not particularly limited, but it is usually suitable to be about 50% by mass or greater, and it is preferable to be about 90 to 99% by mass (e.g., about 95 to 99% by mass).

As the binder, among those listed above for the positive electrode, can be used one species alone, or two or more species in combination. The amount of the binder added can be suitably selected in accordance with the type and amount of the negative electrode active material. For instance, it can be about 1 to 5% by mass of the entire negative electrode material layer.

As the negative current collector 42, can be preferably used a conductive material formed of a metal having good conductivity. For instance, copper or an alloy containing copper as the primary component can be used. Negative current collector 42 may have a variety of shapes, similarly to positive current collector 32. In the present embodiment, a copper sheet is used as negative current collector 42 and can be preferably used in lithium-ion secondary battery 100 comprising wound electrode body 20. In such an embodiment, for example, a copper sheet (copper foil) having a thickness of about 5 $\mu$m to 30 $\mu$m can be preferably used.

As separator 50 to be placed between positive electrode sheet 30 and negative electrode sheet 40, can be used a separator similar to those generally used in the pertaining field without particular limitations. For example, can be used a porous sheet of a resin such as polyethylene (PE), polypropylene (PP), polyester, cellulose, polyamide, or the like. Preferable examples include a porous sheet (a micro-porous resin sheet) consisting of a single layer or multiple layers constituted primarily with one, two or more species of polyolefin resin. For example, can be used preferably a PE sheet, a PP sheet, a tri-layer (PP/PEPP) sheet in which a PP layer is laminated on each face of a PE layer, or the like. The thickness of the separator is preferably set within a range of for instance, about 10 $\mu$m to 40 $\mu$m.

The non-aqueous electrolyte solution disclosed herein can be used as a gel electrolyte obtained by gelling a portion or all of the solution by a suitable method. A battery (e.g., a lithium-ion secondary battery) comprising such a gel electrolyte can be made preferably in an embodiment where a separator is omitted. Alternatively, it may be a battery comprising a gel electrolyte and a separator.

A lithium-ion secondary battery 100 having such a constitution can be fabricated, for instance, by placing a wound electrode body 20 into a case 10 via an opening 12 thereof, placing a lid 14 over opening 12 of the case 10, and subsequently injecting an electrolyte solution 90 via an injection hole (not shown in the drawings) provided in lid 14 followed by closing the injection hole.

Here, the composition and the amount (injection amount) of electrolyte solution 90 used can be set, for instance, so that the amount of $BF_3$-cyclic ether complex contained in the electrolyte solution 90 is greater than 0 mg/cm$^2$, but 0.2 mg/cm$^2$ or less of the external surface area of negative electrode active material layer (negative electrode actie material portion) 44. The concentration of $BF_3$-cyclic ether complex in the electrolyte solution, the usage of the electrolyte solution and the external surface area of the negative electrode active material portion can be adjusted so that the $BF_3$-cyclic ether complex content in the electrolyte solution will satisfy the prescribed ranges in relation to the external surface area of the negative electrode active material portion. The $BF_3$-cyclic ether content in the electrolyte solution can be, for instance, greater than zero part by mass, but 3 parts by mass or less (preferably 2 parts by mass or less, more preferably 1 part by mass or less, typically less than 1 part by mass) relative to 100 parts by mass of the other electrolyte solution components. In usual, the amount of $BF_3$-cyclic ether complex per area of the negative electrode active material portion is suitably greater than 0 mg/cm$^2$, but 0.1 mg/cm$^2$ or less (typically less than 0.1 mg/cm$^2$). In a preferable embodiment, it is 0.05 mg/cm$^2$ or less (e.g., 0.03 mg/cm$^2$ or less). The lower limit of the amount of $BF_3$-cyclic ether complex per area of the negative electrode active material portion is not particularly limited as far as the battery capabilities can be increased by the complex in that amount in comparison to a lithium-ion secondary battery constituted with an electrolyte solution (the standard electrolyte solution) having a composition free of a $BF_3$ complex. It is usually suitable to be 0.001 mg/cm$^2$ or greater (typically 0.005 mg/cm$^2$ or greater, e.g., 0.01 mg/cm$^2$ or greater).

The composition and the amount (injection amount) of electrolyte solution 90 used can be set so that the amount of $BF_3$-cyclic ether complex contained in the electrolyte solution 90 is, based on $BF_3$, greater than 0 mg/cm$^2$, but 0.1 mg/cm$^2$ or less (typically less than 0.1 mg/cm$^2$) of the external surface area of negative electrode active material layer 44. In a preferable embodiment, the amount of $BF_3$-cyclic ether complex is 0.05 mgcm$^2$ or less (more preferably 0.03 mg/cm$^2$ or less, e.g., 0.02 mg/cm$^2$ or less) based on $BF_3$. While the $B_3$-based lower limit of the amount of $BF_3$-cyclic ether complex per area of negative electrode active material portion is not particularly limited, it is usually suitable to be 0.001 mg/cm$^2$ or greater (typically 0.005 mg/cm$^2$ or greater).

It is noted that the "external surface area of the negative electrode active material portion" refers to the area (exposed area) facing the electrolyte solution in the exterior of negative electrode active material portion. In a negative electrode active material layer 44 retained on a surface of a sheet of current collector 42 as in the present embodiment, the area of the active material layer 44 facing current collector 42 is not included in the external surface area. In such an embodiment, the external surface area of the negative electrode active material portion can be usually considered the same as the area on which the negative electrode active material layer is formed.

Several worked examples relevant to the present invention are described below although the present invention is not to be limited to these specific examples.

Example 1

Preparation of Electrolyte Solution Containing $BF_3$-THP Complex

To a reaction vessel, were added 10.96 g (77 mmol) of a commercial $BF_3$-diethyl ether complex ($BF_3$-$Et_2O$ complex; chemical formula (1) below) and 8.17 g (95 mmol) of tetrahydropyran (THP). The resulting mixture was stirred at room temperature under a nitrogen flow for 10 hours to carry out transetherification reaction. Subsequently, the reaction mixture was subjected to vacuum distillation to obtain 10.45 g (68 mmol) of $BF_3$-THP complex as a colorless liquid. The resulting $BF_3$-THP complex was analyzed by $^1$H-NMR and $^{13}$C-NMR. From the spectra, it was confirmed that the target $BF_3$-THP complex (chemical formula (2) below) had been synthesized.

[Chem 1]

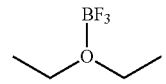

(1)

[Chem 2]

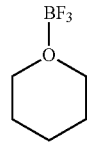

(2)

A solution containing 1 mol/L of $LiPF_6$ in a mixed solvent formed of BC and EMC (volume ratio 3:7) was obtained as a standard electrolyte solution NA. To this standard electrolyte solution NA, the $BF_3$-THP complex was added and dissolved. Five electrolyte solution samples were prepared to have different $BF_3$-THP complex contents, by adding $BF_3$-THP complex to five different levels, namely, 0.05 part by mass, 0.1 part by mass, 1 part by mass, 2 parts by mass and 5 parts by mass relative to 100 parts by mass of standard electrolyte solution NA. Hereinafter, these electrolyte solution samples may be referred to as THP.$BF_3$-1, THP.$BF_3$-2, THP.$BF_3$-3, THP.$BF_3$-4, THP.$BF_3$-5 in order of increasing $BF_3$-THP complex content.

Example 2

Preparation of Electrolyte Solution Containing $2BF_3$-DOX Complex

To a reaction vessel, were added 3.0 g of dehydrated dioxane (DOX) and 4.0 g of 3$BF_3$-$Et_2O$) complex. The resulting mixture was stirred at 45° C. under a nitrogen flow for 3 days to carry out transetherification reaction. Subsequently, the reaction mixture was subjected to vacuum distillation to obtain 2.4 g of 2$BF_3$-DOX complex as a colorless solid. The resulting 2$BF_3$-DOX complex was analyzed by $^1$H-NMR, $^{13}$C-NMR, and mass spectrometry (GC-MS). As a result, only one peak appeared in the NMR analysis, and the presence of peaks corresponding to 2$BF_3$-DOX complex were confirmed in the mass spectroscopy analysis while no peak appeared at the molecular weight corresponding to 1$BF_3$-DOX complex (a complex in which only one of the two oxygen atoms constituting dioxane is bound to $BF_3$). Thus, the resulting complex was confirmed to be 2$BF_3$-DOX complex (chemical formula (3) below).

[Chem 3]

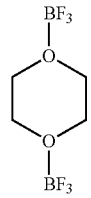

(3)

To the standard electrolyte solution NA, the 2$BF_3$-DOX complex was added and dissolved. Five electrolyte solution samples were prepared to have different 2$BF_3$-DOX complex contents, by adding $2BF_3$-DOX complex to five different levels, namely, 0.05 part by mass, 0.1 part by mass, 1 part by mass, 2 parts by mass and 5 parts by mass relative to 100 parts by mass of standard electrolyte solution NA. Hereinafter, these electrolyte solution samples may be referred to as DOX·$2BF_3$-1, DOX·$2BF_3$-2, DOX·$2BF_3$-3, DOX·$2BF_3$-4, DOX·$2BF_3$-5 in order of increasing $2BF_3$-DOX complex content.

Example 3

Preparation of Electrolyte Solution Containing $BF_3$-EtO Complex

To 100 parts by mass of standard electrolyte solution NA, 0.1 part by mass of $BF_3$-$Et_2O$ complex was added and dissolved to prepare an electrolyte solution sample $Et_2O$·$BF_3$-1.

Example 4

Fabrication of Lithium-Ion Secondary Battery

Using the respective electrolyte solutions prepared in Examples 1 to 3 and the standard electrolyte solution NA, lithium-ion secondary batteries were fabricated for evaluation as follows.

For each of the lithium-ion secondary batteries, a positive electrode was fabricated as follows: In particular, to 25 g of a N-methylpyrrolidone (NMP) solution containing 1.5 g of PVDF as a binder, were added 7.5 g of a lithiumr nickel cobalt manganese composite oxide represented by composition formula $LiNi_{1/3}Co_{1/3}Mn_{1/3}O_2$ as a positive electrode active material and 1.0 g of acetylene black as a conductive material. The resultant was mixed homogeneously to prepare a slurry composition (a composition for forming positive electrode active material layers). The composition was applied to one face of 15 μm thick aluminum foil (positive current collector) at a coating amount of 6.5 mg/cm$^2$ (based on the solid content). The coating was allowed to dry, and after pressed, the resultant was cut out to a prescribed size (a circle of 14 mm diameter) to obtain a positive electrode.

For each of the lithium-ion secondary batteries, a negative electrode was fabricated as follows: In particular, to 11 g of a NMP solution containing 0.75 g of PVDF, was added 9.25 g of graphite as a negative electrode active material, and the resultant was mixed homogeneously to prepare a slurry composition (a composition for forming negative electrode active material layers). The composition was applied to one face of 10 μm thick copper foil (negative current collector) at a coating amount of 4.3 mg/cm$^2$ (based on the solid content). The coating was allowed to dry and after pressed, the resultant was cut out to a prescribed size (a circle of 16 mm diameter with an area of 2.0 cm$^2$) to obtain a negative electrode.

As a separator, was used a 25 μm thick PP/PE composite porous film cut out to a prescribed size (a circle of 19 mm diameter).

Figure 13:
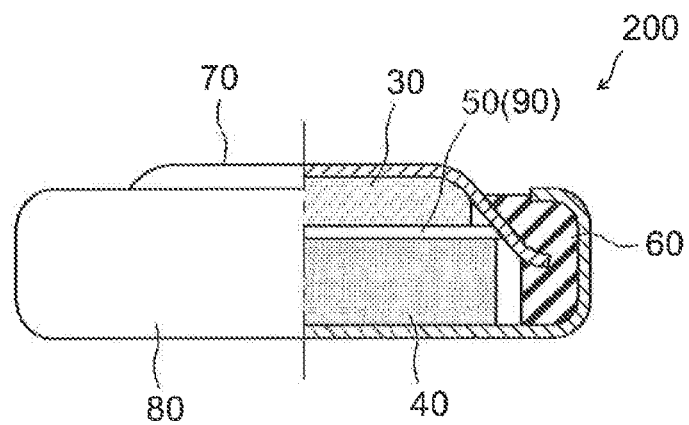
FIG. 13 shows a partial cross-sectional view illustrating a coin cell fabricated in the worked examples.

Using these battery components, was fabricated a coin cell (2032 type) battery 200 having a construction schematically shown in FIG. 13. In particular; the negative electrode 40 fabricated above was placed in a container 80 (negative terminal). A separator 50 was overlaid on top of the negative electrode 40, and a non-aqueous electrolyte solution 90 was dropped thereon. The amount dropped was 51 mg±5 mg. Subsequently, the positive electrode 30 fabricated above was placed on top of separator 50, and the container 80 was sealed with a gasket 60 and a lid 70 (positive terminal) to construct battery 200. The resulting battery was then subjected to an initial charging and discharging (conditioning) process where charging at a rate of 1/10 C to a voltage of 4.2 V across terminals and discharging at the same rate to 3.0 V were alternately repeated two times.

[Evaluation of Discharge Rate Performance]

Using three pieces of the coin cell lithium-ion secondary battery for each electrolyte solution composition, the discharge rate performance was evaluated at a temperature of 25° C. (i.e., n=3). In particular, each battery after the initial charging and discharging process was charged at a rate of 1 C (here 1.15 mA) to 4.2 V and further charged at 4.2 V to a total charging time of 2.5 hours. The battery after such a constant current-constant voltage (CC-CV) charging process was CC-discharged at a discharge rate of 0.3 C to 3 V and the discharge capacity (0.3 C discharge capacity) was measured at the same time. Subsequently, after the battery was CC-CV charged again under the same conditions, the battery was CC-discharged at a discharge rate of 1 C to 3 V, and the discharge capacity (1 C discharge capacity) was measured at the same time. By the same procedure, discharge capacities at rates of 5 C, 10 C, 15 C and 20 C were measured, respectively. The discharge capacity values thus measured were converted to values per mass of positive electrode active material (specific discharge capacity (mAh/g)).

The results (arithmetic mean values of three batteries) obtained along with the specific discharge capacity of the battery using the standard electrolyte solution NA are shown in Table 1 for the electrolyte solutions containing $BF_3$-THP complex, in Table 2 for the electrolyte solutions containing $2BF_3$-DOX complex, and in Table 3 for the electrolyte solutions containing $BF_3$-$Et_2O$ complex. Tables 1 also show the $BF_3$ complex contents (parts by mass) relative to 100 parts by mass of the other electrolyte solution components for the respective electrolyte solutions based on the $BF_3$ complex (i.e., based on the compound) and based on $BF_3$. In addition, for the batteries constructed with the respective electrolyte solution, the $BF_3$ complex contents (mg/cm$^2$) per surface area (which can be considered the same as the area of one face of the negative electrode in the coin cell battery having the constitution described above) of negative electrode active material layers of the batteries are shown based on both the $BF_3$ complex and $BF_3$. In the following description, the amount of $BF_3$ complex refers to an amount "based on the $BF_3$ complex" relative to 100 parts by mass of the standard electrolyte solution unless otherwise indicated.

TABLE 1

| Electrolyte solution sample | | NA | THP·$BF_3$-1 | THP·$BF_3$-2 | THP·$BF_3$-3 | THP·$BF_3$-4 | THP·$BF_3$-5 |
|---|---|---|---|---|---|---|---|
| Amount added to 100 parts by mass of standard electrolyte solution NA | Based on $BF_3$ complex (parts by mass) | 0 | 0.05 | 0.1 | 1.0 | 2.0 | 5.0 |
| | Based on $BF_3$ (parts by mass) | 0 | 0.022 | 0.044 | 0.44 | 0.88 | 2.2 |
| Content per surface area of negative electrode active material layer | Based on $BF_3$ complex (mg/cm$^2$) | 0 | 0.0125 | 0.025 | 0.25 | 0.50 | 1.25 |
| | Based on $BF_3$ (mg/cm$^2$) | 0 | 0.0055 | 0.011 | 0.11 | 0.22 | 0.55 |

TABLE 1-continued

| Electrolyte solution sample | | NA | THP•BF$_3$-1 | THP•BF$_3$-2 | THP•BF$_3$-3 | THP•BF$_3$-4 | THP•BF$_3$-5 |
|---|---|---|---|---|---|---|---|
| Specific discharge capacity (mAh/g) | 0.3 C | 128.8 | 132.8 | 137 | 127.4 | 128.0 | 111.6 |
| | 1 C | 119.1 | 127.8 | 134 | 120.4 | 123.4 | 105.0 |
| | 5 C | 104.0 | 117.5 | 128.4 | 108.4 | 114.3 | 91.9 |
| | 10 C | 95.3 | 108.1 | 122.7 | 99.7 | 107.1 | 81.9 |
| | 15 C | 89.1 | 104.0 | 118.7 | 95.2 | 100.9 | 75.0 |
| | 20 C | 69.6 | 86.5 | 105.0 | 80.0 | 81.9 | 62.9 |

TABLE 2

| Electrolyte solution sample | | NA | DOX•2BF$_3$-1 | DOX•2BF$_3$-2 | DOX•2BF$_{3\text{-}3}$ | DOX•2BF$_3$-4 | DOX•2BF$_3$-5 |
|---|---|---|---|---|---|---|---|
| Amount added to 100 parts by mass of standard electrolyte solution NA | Based on BF$_3$ complex (parts by mass) | 0 | 0.05 | 0.1 | 1.0 | 2.0 | 5.0 |
| | Based on BF$_3$ (parts by mass) | 0 | 0.03 | 0.061 | 0.61 | 1.2 | 3.0 |
| Content per surface area of negative electrode active material layer | Based on BF$_3$ complex (mg/cm$^2$) | 0 | 0.0125 | 0.025 | 0.25 | 0.50 | 1.25 |
| | Based on BF$_3$ (mg/cm$^2$) | 0 | 0.0075 | 0.015 | 0.15 | 0.30 | 0.75 |
| Specific discharge capacity (mAh/g) | 0.3 C | 128.8 | 139.4 | 136.5 | 124.4 | 123.4 | 99.2 |
| | 1 C | 119.1 | 136.2 | 131.2 | 116.0 | 119.2 | 96.8 |
| | 5 C | 104.0 | 130.5 | 120.0 | 103.8 | 110.0 | 87.3 |
| | 10 C | 95.3 | 124.5 | 110.7 | 95.8 | 102.8 | 76.0 |
| | 15 C | 89.1 | 119.6 | 107.3 | 94.1 | 98.2 | 68.1 |
| | 20 C | 69.6 | 105.9 | 90.1 | 82.6 | 87.3 | 59.0 |

TABLE 3

| Electrolyte solution sample | | NA | Et$_2$O•BF$_3$-1 |
|---|---|---|---|
| Amount added to 100 parts by mass of standard electrolyte solution NA | Based on BF$_3$ complex (parts by mass) | 0 | 0.1 |
| | Based on BF$_3$ (parts by mass) | 0 | 0.048 |
| Content per surface area of negative electrode active material layer | Based on BF$_3$ complex (mg/cm$^2$) | 0 | 0.025 |
| | Based on BF$_3$ (mg/cm$^2$) | 0 | 0.012 |
| Specific discharge capacity (mAh/g) | 0.3 C | 128.8 | 137.6 |
| | 1 C | 119.1 | 131.3 |
| | 5 C | 104.0 | 116.6 |
| | 10 C | 95.3 | 107.1 |
| | 15 C | 89.1 | 103.8 |
| | 20 C | 69.6 | 87.3 |

Figure 3:
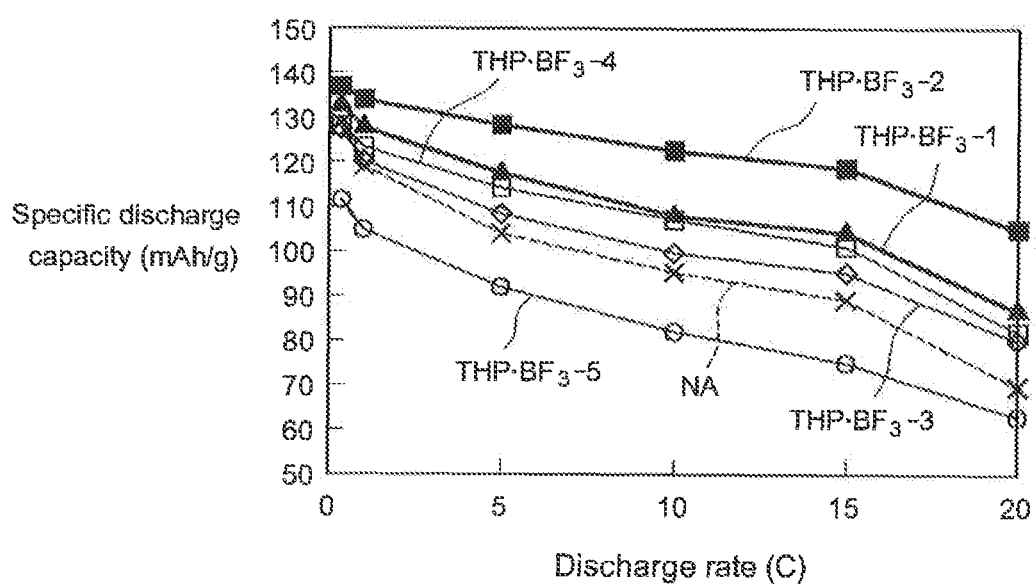
FIG. 3 shows a characteristic graph illustrating the relationship between the discharge rate and the specific discharge capacity.

FIG. 3 shows a characteristic graph plotting the results of specific discharge capacity measurements shown in Table 1 versus the discharge rate, illustrating the discharge rate performance of the respective batteries constructed with 6 different electrolyte solutions containing different amounts of BF$_3$-THP complex (or not containing any BF$_3$ complex). As shown in the graph, in each battery using one of the electrolyte solutions, as the discharge rate increased, the specific discharge capacity showed a tendency to decrease. However, according to THP.BF$_3$-1, -2, -3, and -4 containing BF$_3$-THP complex at 3 parts by mass or less (more specifically 2 parts by mass or less, in particular, 0.05 parts by mass, 0.1 parts by mass, 1 part by mass and 2 parts by mass, respectively) relative to 100 parts by mass of the other electrolyte solution components (standard electrolyte solution NA here), the specific discharge capacity increased as compared to the standard electrolyte solution NA free of a BF$_3$ complex. The increase in the specific discharge capacity tended to be larger particularly at a high rate (e.g., 5 C or higher) rather than at a low rate. As a result the batteries comprising these electrolyte solutions showed effective improvement in the discharge rate performance. On the other hand, according to electrolyte solution THP.BF$_3$-5 containing 5 parts by mass of BF$_3$-THP complex, the specific discharge capacity was actually lower than that by the standard electrolyte solution NA at all discharge rates where measurements were made.

Figure 4:
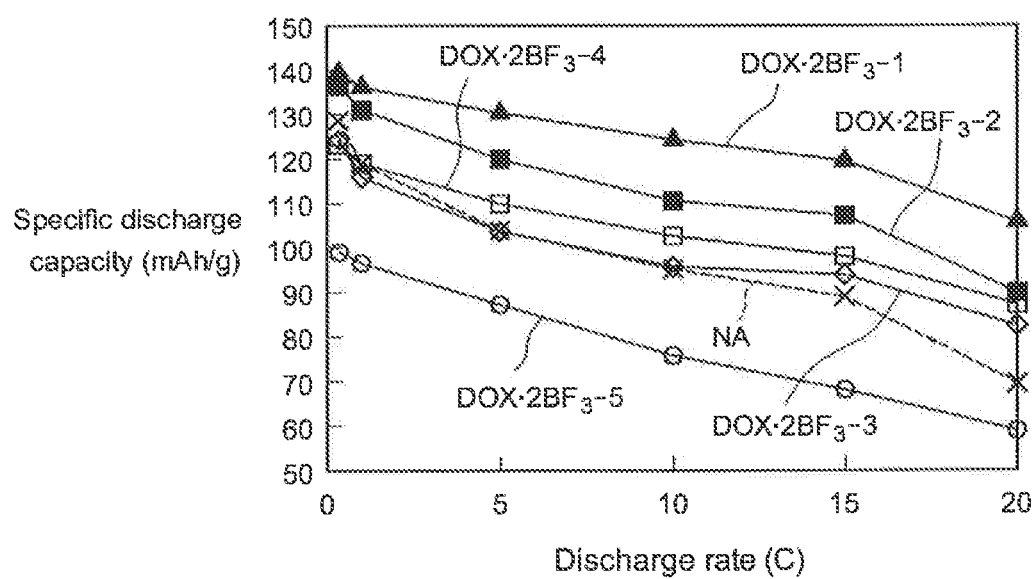
FIG. 4 shows a characteristic graph illustrating the relationship between the discharge rate and the specific discharge capacity.

FIG. 4 shows a characteristic graph plotting the results of specific discharge capacity measurements shown in Table 2 versus the discharge a rte, illustrating the discharge rate performance of the respective batteries constructed with 6 different electrolyte solutions containing different amounts of 2BF$_3$-DOX complex (or not containing any BF$_3$ complex). As shown in the graph, in each battery using one of the electrolyte solutions, as the discharge rate increased, the specific discharge capacity showed a tendency to decrease. However, according to DOX.2BF$_3$-1, -2, -3, and -4 containing 2BF$_3$-DOX complex at 3 parts by mass or less (more precisely 2 parts by mass or less; specifically, 0.05 parts by mass, 0.1 parts by mass, 1 part by mass and 2 parts by mass, respectively) relative to 100 parts by mass of standard electrolyte solution NA, the specific discharge capacity increased as compared to the standard electrolyte solution NA free of a BF$_3$ complex. The increase in the specific discharge capacity tended to be larger particularly at a high rate (e.g., 5 C or higher) rather than at a low rate. As a result, the batteries comprising these electrolyte solutions showed effective improvement in the discharge rate performance. On the other hand, according to electrolyte solution DOX2BF$_3$-5 containing 5 parts by mass of 2BF$_3$-DOX complex, the specific discharge capacity was actually lower than that by the standard electrolyte solution NA at all discharge rates where measurements were made.

Figure 5:
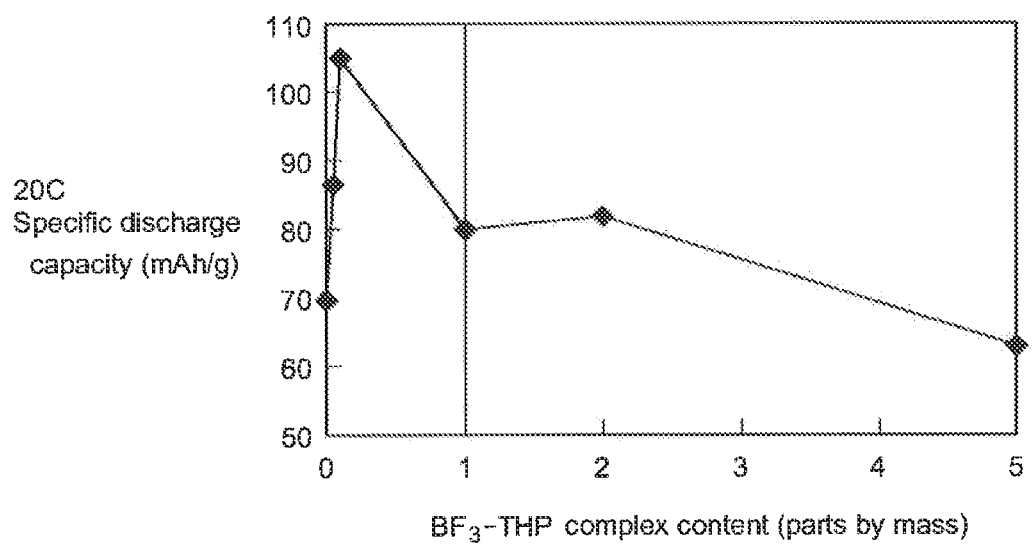
FIG. 5 shows a characteristic graph illustrating the relationship between the $BF_3$-THP complex content and the 20 C specific discharge capacity.

FIG. 5 shows a characteristic graph plotting the specific discharge capacity at the 20 C discharge rate versus the BF$_3$-THP complex content. As shown well in the graph, the 20 C specific discharge capacity improved when the complex content was at about 3 parts by mass or less relative to 100 parts by mass of the other electrolyte components. When the complex content was below 1 part by mass (preferably below 0.7 part by mass, e.g., below 0.5 part by mass, typically 0.05 part by mass or above), particularly high effect was obtained. For instance, the 20 C specific discharge capacity increased by 10% or more (by 20% or more in a preferable embodiment, by 30% or more in a more preferable embodiment) relative to the standard electrolyte solution NA.

Figure 6:
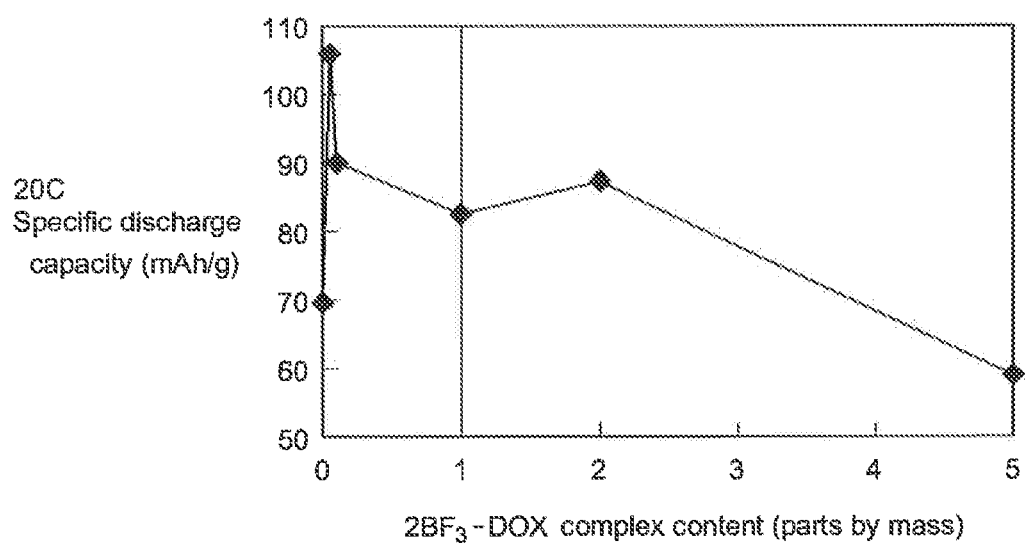
FIG. 6 shows a characteristic graph illustrating the relationship between the $2BF_3$-DOX complex content and the 20 C specific discharge capacity.

FIG. 6 shows a characteristic graph plotting the specific discharge capacity at the 20 C discharge rate versus the $2BF_3$-DOX complex content. As shown well in the graph, the 20 C specific discharge capacity improved when the complex content was at about 3 parts by mass or less relative to 100 parts by mass of standard electrolyte solution NA. When the complex content was below 1 part by mass (preferably below 0.5 part by mass, e.g., below 0.1 part by mass, typically 0.01 part by mass or above), particularly high effect was obtained. For instance, the 20 C specific discharge capacity increased by 10% or more (by 20% or more in a preferable embodiment, by 30% or more in a more preferable embodiment) relative to the standard electrolyte solution NA.

Figure 7:
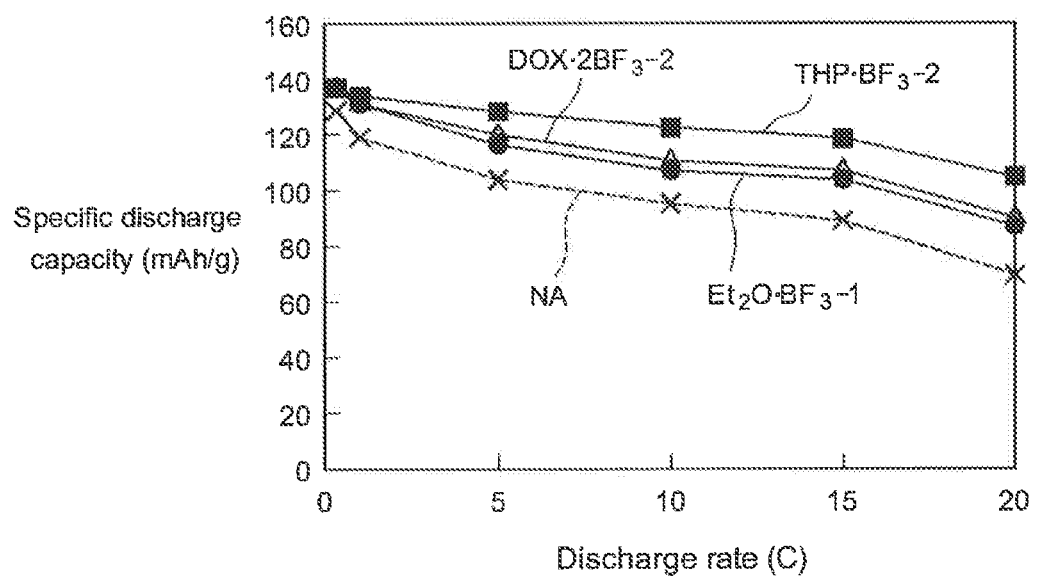
FIG. 7 shows a characteristic graph illustrating the relationship between the discharge rate and the specific discharge capacity.

FIG. 7 shows a plot of the specific discharge capacity versus the discharge rate with respect to the standard electrolyte solution NA, the electrolyte solution (THP.$BF_3$-2) in which 0.1 part by mass of $BF_3$-THP complex had been added relative to 100 parts by mass of standard electrolyte solution NA, the electrolyte solution (DOX.$2BF_3$-2) in which 0.1 part by mass of $2BF_3$-DOX complex had been added likewise, and the electrolyte solution ($Et_2O.BF_3$-1) in which 0.1 part by mass of $BF_3$-$Et_2O$ complex had been added likewise. These results support that according to an electrolyte solution (THP.$BF_3$-2, DOX.$2BF_3$-2) containing a BFI-cyclic ether complex in a range below 1 part by mass relative to 100 parts by mass of the other electrolyte solution components (standard electrolyte solution NA here), in comparison to an electrolyte solution ($Et_2O.BF_3$-1) containing the same parts by mass of a $BF_3$-acyclic ether complex, the specific discharge capacity (especially, the specific discharge capacity at a high discharge rate of 5 C or above) of the standard electrolyte solution NA can be increased to a greater extent, and as a result, the discharge rate performance can be better improved.

Figure 8:
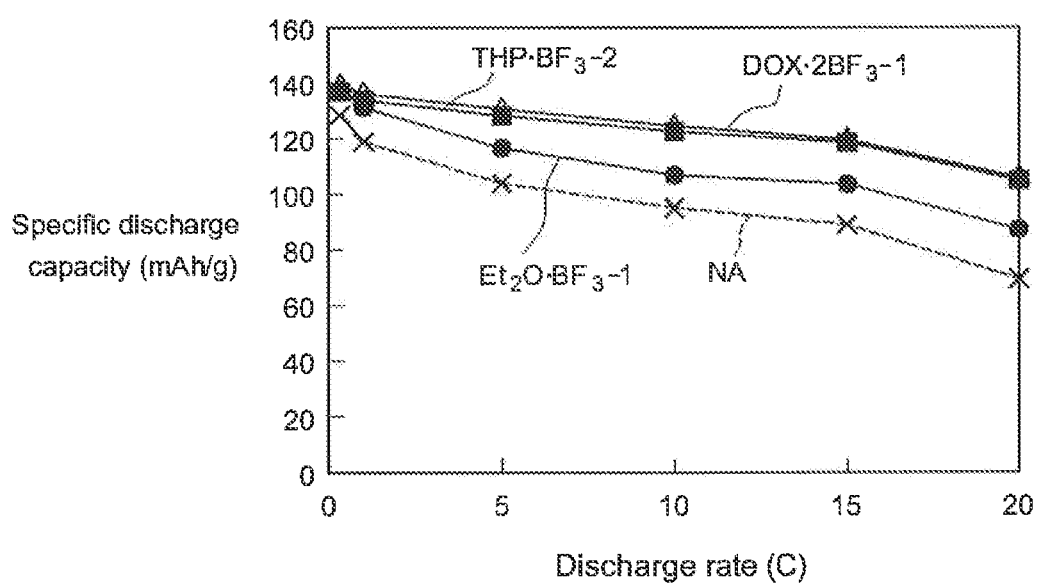
FIG. 8 shows a characteristic graph illustrating the relationship between the discharge rate and the specific discharge capacity.

FIG. 8 shows a plot of the specific discharge capacity versus the discharge rate with respect to the standard electrolyte solution NA, the electrolyte solution (THP.$BF_3$-2) in which 0.1 part by mass (0.044 part by mass based on $BF_3$) of $BF_3$-THP complex had been added relative to 100 parts by mass of standard electrolyte solution NA, the electrolyte solution (DOX.$2BF_3$-1) in which 0.05 part by mass (0.03 part by mass based on $BF_3$) of $2BF_3$-DOX complex had been added, the electrolyte solution ($Et_2O.BF_3$-1) in which 0.1 part by mass (0.048 part by mass based on $BF_3$) of $BF_3$-$Et_2O$ complex had been added. These results support tht according to an electrolyte solution (THP.$BF_3$-2, DOX.$2BF_3$-1) containing a $BF_3$-cyclic ether complex in a range of 0.05 part by mass or below (e.g., about 0.02 to 0.05 part by mass, typically below 0.05 part by mass) relative to 100 parts by mass of the other electrolyte solution components (standard electrolyte solution NA here), in comparison to an electrolyte solution ($Et_2O.BF_3$-1) containing approximately the same parts by mass of a $BF_3$-acyclic ether complex based on $BF_3$, the specific discharge capacity (especially, the specific discharge capacity at a high discharge rate of 5 C or above) of the standard electrolyte solution NA can be increased to a greater extent, and as a result, the discharge rate performance can be better improved.

[Evaluation of Cycle Properties]

Figure 9:
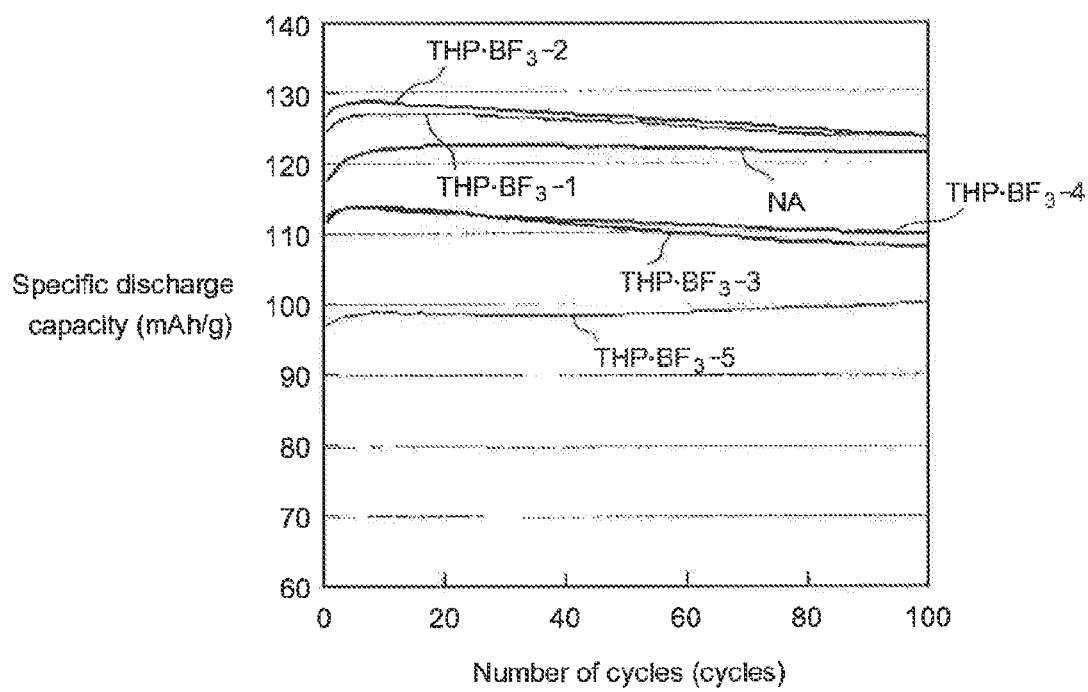
FIG. 9 shows a characteristic graph illustrating the relationship between the number of cycles and the specific discharge capacity.
Figure 10:
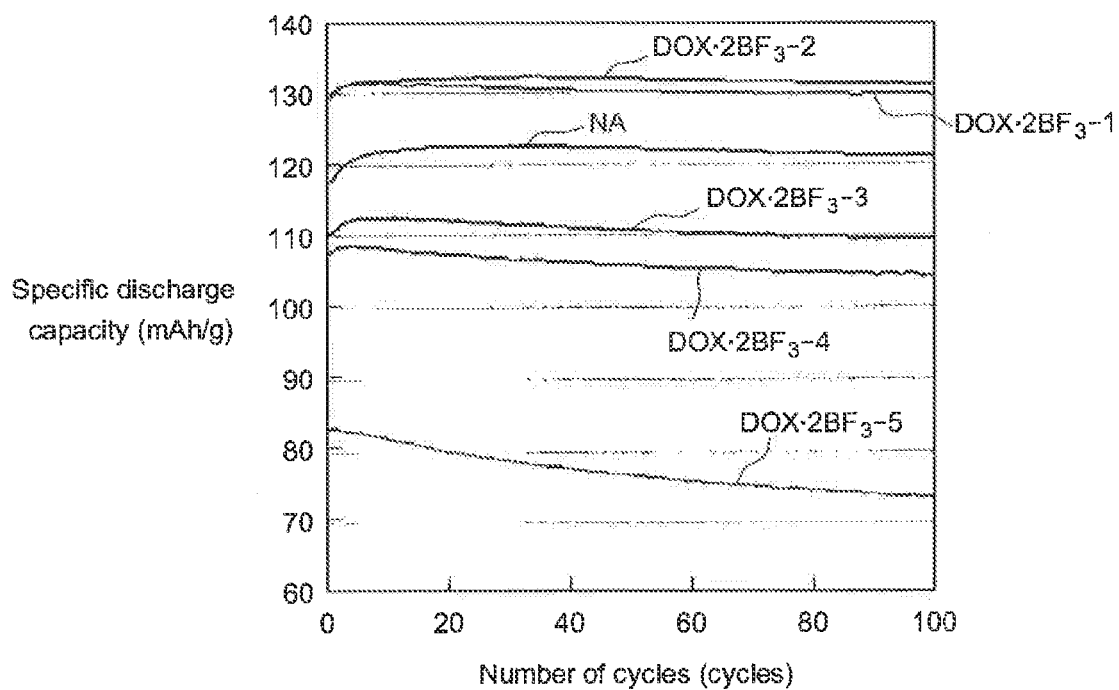
FIG. 10 shows a characteristic graph illustrating the relationship between the number of cycles and the specific discharge capacity.
Figure 11:
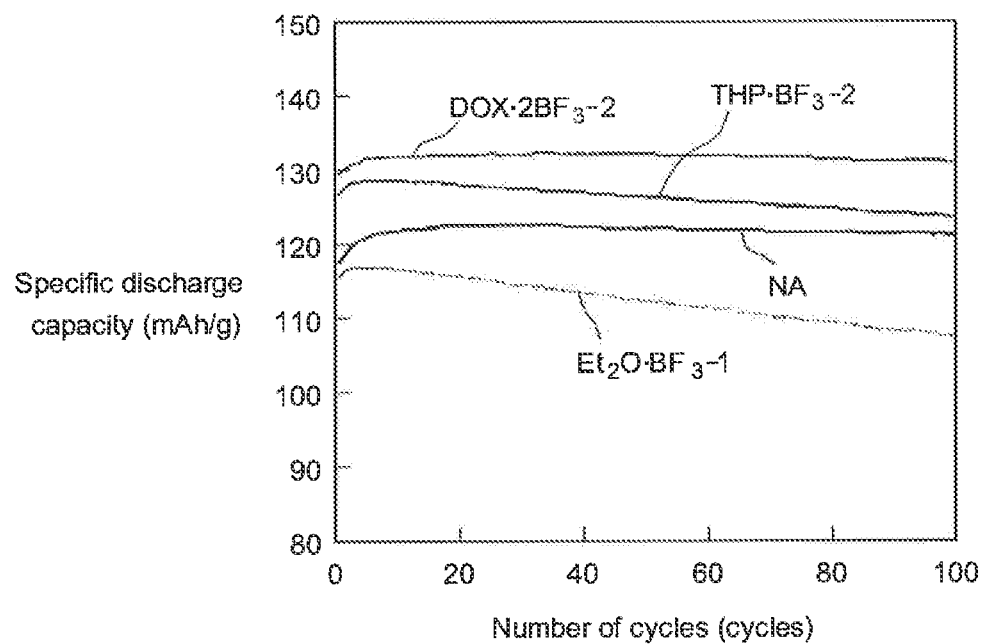
FIG. 11 shows a characteristic graph illustrating the relationship between the number of cycles and the specific discharge capacity.

Using three pieces of the coin cell lithium-ion secondary battery for each electrolyte solution composition, the cycle properties were evaluated at a temperature of 25° C. (i.e., n=3). In particular, each battery after the initial charging and discharging process was charged at a rate of 2 C to 4.2 V and further charged at 4.2 V to a total charging time of 2 hours (CC-CV charging). Subsequently, the battery was subjected to 100 cycles of alternate discharging at a constant current of 2 C to 3.0 V and charging at a constant current of 2 C to 4.2 V (cycle test), and the discharge capacity during each cycle was measured and converted to the specific discharge capacity. FIGS. 9 to 11 show the results (arithmetic mean values of three batteries) as changes of the specific discharge capacities with increase in the number of cycles.

FIG. 9 shows a plot of the change of the specific discharge capacity with increase in the number of cycles for the respective batteries (batteries listed in Table 1) constituted with the 6 different electrolyte solutions containing different amounts of $BF_3$-THP complex (or not containing any $BF_3$ complex). As shown in the plot, as compared to the standard electrolyte solution NA free of a $BF_3$ complex, THP.$BF_3$-1 and -2 exhibited higher initial specific discharge capacities and retained higher levels of specific discharge capacities even when the number of cycles was increased, with each containing $BF_3$-TH-IP complex in an amount less than 1 part by mass (more precisely 0.1 part by mass or less; specifically, 0.05 part by mass and 0.1 part by mass, respectively) relative to 100 parts by mass of standard electrolyte solution NA. It is noted that the difference in the initial specific discharge capacity is considered to be attributed to a difference in the quality of SEI films formed during the initial charging and discharging (conditioning) process after the battery fabrication.

On the contrary, THP.$BF_3$-3, -4 and -5 containing $BF_3$-THP complex at 1 part by mass or greater (specifically 1 part by mass, 2 parts by mass and 5 parts by mass, respectively) showed consistently lower specific discharge capacities than that of the standard electrolyte solution NA free of a $BF_3$ complex from the first cycle through the end of 100 cycles. Especially, with THP.$BF_3$-5 containing 5 parts by mass of $BF_3$-THP complex, the specific discharge capacity decreased significantly. These results support that according to an electrolyte solution containing a $BF_3$-cyclic ether complex ($BF_3$-THP complex, here) at less than 1 part by mass relative to 100 parts by mass of standard electrolyte solution NA, the discharge rate performance can be substantially improved, and even the cycle properties can be increased as well.

The plot in FIG. 10 shows a plot of the change of the specific discharge capacity with increase in the number of cycles for the respective batteries (batteries listed in Table 2) constituted with the 6 different electrolyte solutions containing different amounts of $2BF_3$-DOX complex (or not containing any $BF_3$ complex). As shown in the plot, as compared to the standard electrolyte solution NA free of a $BF_3$ complex, DOX.$2BF_3$-1 and -2 exhibited higher initial specific discharge capacities and retained higher levels of specific discharge capacities even when the number of cycles was increased, with each containing $2BF_3$-DOX complex in an amount less than 1 part by mass (more precisely 0.1 part by mass or less; specifically 0.05 part by mass and 0.1 part by mass, respectively) relative to 100 parts by mass of standard electrolyte solution NA.

On the contrary, DOX.$2BF_3$-3, -4 and -5 containing $2BF_3$-DOX complex at 1 part by mass or greater (specifically, 1 part by mass, 2 parts by mass and 5 parts by mass, respectively) showed consistently lower specific discharge capacities than that of the standard electrolyte solution NA free of a $BF_3$ complex from the first cycle through the end of 100 cycles. Especially, with DOX.2BF$_3$-5 containing 5 parts by mass of 2BF$_3$-DOX complex, the specific discharge capacity decreased significantly. These results support that according to an electrolyte solution containing a BF$_3$-cyclic ether complex (2BF$_3$-DOX complex, here) at less than 1 part by mass relative to 100 parts by mass of standard electrolyte solution NA, the discharge rate performance can be substantially improved, and even the cycle properties can be increased as wel.

FIG. 11 shows a plot of the change of the specific discharge capacity with increase in the number of cycles with respect to the standard electrolyte solution NA, the electrolyte solution (THP.BF$_3$-2) in which 0.1 part by mass of BF$_3$-THP complex had been added relative to 100 parts by mass of standard electrolyte solution NA, the electrolyte solution (DOX.2BF$_3$-2) in which 0.1 part by mass of 2BF$_3$-DOX complex had been added likewise, and the electrolyte solution (Et$_2$O.BF$_3$-1) in which 0.1 part by mass of BF$_3$-Et$_2$O complex had been added likewise. As shown in the plot, according to an electrolyte solution (THP.BF$_3$-2, DOX.2BF$_3$-2) containing a BF$_3$-cyclic ether complex in a range below 1 part by mass relative to 100 parts by mass of standard electrolyte solution NA, as compared to the standard electrolyte solution, the cycle properties improved (the loss of the specific discharge capacity upon the cycle test was smaller), and even the initial specific discharge capacity increased.

On the other hand, in contrast to the effect obtainable by a BF$_3$-cyclic ether complex content described above, as compared to the standard electrolyte solution NA free of a BF$_3$ complex, clearly inferior cycle properties were observed for the electrolyte solution (Et$_2$O.BF$_3$-1) containing a BF$_3$-acyclic ether complex in an amount equal to the parts by mass of the BF$_3$-cyclic ether complex.

Although the present invention have been described in detail above, the embodiments described above are merely examples, and the art disclosed herein includes various modifications and changes made to the specific examples illustrated above.

INDUSTRIAL APPLICABILITY

Figure 12:
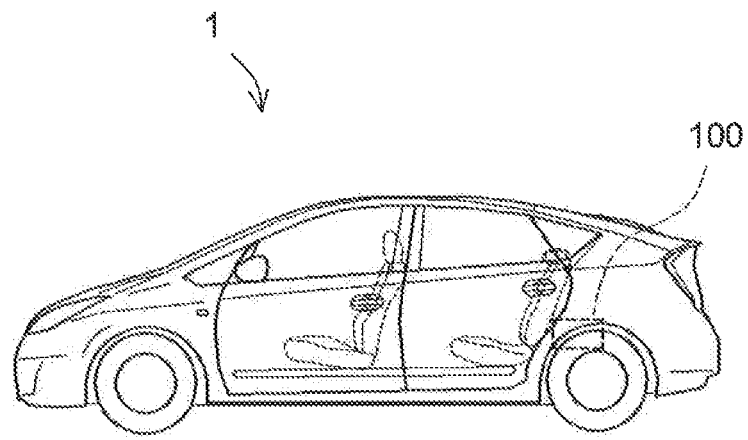
FIG. 12 shows a side view of a vehicle comprising a non-aqueous secondary battery according to an embodiment.

A non-aqueous secondary battery (typically a lithium-ion secondary battery) comprising the electrolyte solution provided by the art disclosed herein is less susceptible to degradation caused by charging and discharging, and thus can be used as a secondary battery for various intended purposes. For example, as shown in FIG. 12, a non-aqueous secondary battery 100 disclosed herein can be preferably used as a power supply of a vehicle-driving motor (electric motor) loaded on a vehicle 1 such as an automobile, or the like. While the type of vehicle 1 is not particularly limited, it is typically a hybrid automobile, an electric automobile, a fuel cell c automobile, or the like. Such a non-aqueous secondary battery 100 can be used solely or in a battery system constituted with a plurality of batteries connected linearly or in parallel.

The invention claimed is:

1. A non-aqueous electrolyte solution for a non-aqueous secondary battery comprising:
    a non-aqueous solvent; and
    a BF$_3$-cyclic ether complex comprising at least one of BF$_3$-tetrahydropyran complex and BF$_3$-dioxane complexes;
    wherein the BF$_3$-cyclic ether complex is contained in an amount of greater than zero part by mass, but less than 1 part by mass relative to 100 parts by mass of other electrolyte solution components.

2. The non-aqueous electrolyte solution according to claim 1, wherein 50% by volume or more of the non-aqueous solvent consists of one, two or more species of carbonate-based solvent.

3. A method for producing a lithium-ion secondary battery comprising:
    providing a positive electrode comprising a positive electrode active material, and a negative electrode comprising a negative electrode active material;
    providing the non-aqueous electrolyte solution according to claim 1; and
    constituting a lithium-ion secondary battery by placing the positive electrode, the negative electrode, and the non-aqueous electrolyte solution in a container.

4. The method according to claim 3, wherein
    the negative electrode comprises a negative electrode active material portion comprising the negative electrode active material as the primary component, and
    the non-aqueous electrolyte solution is placed in the container such that the BF$_3$-cyclic ether complex is contained in the electrolyte solution in an amount greater than 0 mg/cm$^2$, but 0.1 mg/cm$^2$ or less of the external surface area of the negative electrode active material portion.

5. The method according to claim 3, wherein the negative electrode active material is carbon particles having a graphite structure at least partially.

6. A lithium-ion secondary battery produced by the method according to claim 3.

7. The lithium-ion secondary battery according to claim 6 used as a drive power supply of a vehicle.

8. The non-aqueous electrolyte solution according to claim 1, wherein the BF$_3$-cyclic ether complex content is in an amount of greater than 0 part by mass and less than 0.5 part by mass relative to 100 parts by mass of the other electrolyte solution components.

9. The non-aqueous electrolyte solution according to claim 1, wherein the BF$_3$-cyclic ether complex is in an amount of equal to or greater than 0.01 part by mass and equal to or less than 0.3 part by mass relative to 100 parts by mass of the other electrolyte solution components.

10. The non-aqueous electrolyte solution according to claim 1, wherein 90% by volume or more of the non-aqueous solvent consists of one, two or more species of carbonate-based solvent.

11. The method according to claim 4, wherein the non-aqueous electrolyte solution is placed in the container such that the BF$_3$-cyclic ether complex is contained in the electrolyte solution in an amount of greater than 0 mg/cm$^2$ and equal to or less than 0.05 mg/cm$^2$ of the external surface area of the negative electrode active material portion.

12. The method according to claim 4, wherein the non-aqueous electrolyte solution is placed in the container such that the BF$_3$-cyclic ether complex is contained in the electrolyte solution in an amount of equal to or greater than 0.001 mg/cm$^2$ and equal to or less than 0.05 mg/cm$^2$ of the external surface area of the negative electrode active material portion.

* * * * *